United States Patent [19]

Gerry

[11] 4,019,110
[45] Apr. 19, 1977

[54] STEPPING MOTOR HAVING ROTATIONAL AND COUNTER ROTATIONAL MAGNETIC FIELD CONTROL

[76] Inventor: Martin E. Gerry, 13452 Winthrope St., Santa Ana, Calif. 92705

[22] Filed: May 19, 1975

[21] Appl. No.: 579,028

[52] U.S. Cl. ............................................. 318/696
[51] Int. Cl.² ...................................... H02K 37/00
[58] Field of Search .................... 318/138, 685, 696

[56] References Cited

UNITED STATES PATENTS

| | | | |
|---|---|---|---|
| 3,297,927 | 1/1967 | Blakeslee et al. | 318/696 |
| 3,573,589 | 4/1971 | Berry | 318/685 X |
| 3,636,429 | 1/1972 | Jakubowski et al. | 318/685 |
| 3,648,144 | 3/1972 | Rosen | 318/696 |
| 3,684,934 | 8/1972 | Loyzim | 318/696 |
| 3,798,526 | 3/1974 | Takahashi et al. | 318/696 |
| 3,849,714 | 11/1974 | Goretzki et al. | 318/696 X |
| 3,864,615 | 2/1975 | Williams | 318/685 X |

*Primary Examiner*—Gene Z. Rubinson

[57] ABSTRACT

A stepping motor having a rotor bearing a font or character retaining wheel inductively coupled to a stator and powered by polyphase pulse power to produce a rotational magnetic field and a rotational torque upon the rotor, the stator also being powered during character selection by polyphase counter rotational magnetic field to produce a counter rotational torque for substantially instantaneous braking action upon the rotor. Means are provided for actuating the character fonts of the print wheel for rapid impact character printing. Auxiliary electro-mechanical braking may also be utilized as back-up and is controlled by the same system.

14 Claims, 8 Drawing Figures

STEPPING MOTOR HAVING ROTATIONAL AND COUNTER ROTATIONAL MAGNETIC FIELD CONTROL

CROSS REFERENCE TO RELATED APPLICATION

This application incorporates by reference, as though fully set forth herein, U.S. Pat. No. 3,842,960 issued Oct. 22, 1974 to same applicant, for cross-correlation the print head and font character wheel thereof with the instant stepping motor.

BACKGROUND OF THE INVENTION

This invention is in the field of stepping type motors generally utilized in connection with machine tool control, and specifically for exact shaft angular positioning of the rotor when used for controlling the print cycle of an impact typewriter head printer.

U.S. Pat. No. 3,667,383 directed to a print head control circuit has the disadvantage of having to utilize two rotating wheels to obtain a differential output in terms of character counts. This patent also does not utilize rapid electrical braking action by failing to provide for equal and opposite torques in a polyphase motor structure.

U.S. Pat. No. 3,757,192 has a control circuit directed to a numerical feed control. Though applicable to an electric typewriter with substantial modification, this patent is basically dependent upon dual pulse motors for obtaining the numerical control. This patent also has the shortcomings mentioned in connection with U.S. Pat. No. 3,667,383, above.

U.S. Pat. No. 3,761,790 is for a control circuit for moving a shaft to a predetermined angular position. This patent utilizes a motor in periodic cooperation with an electromechanical brake to stop the shaft. The motor is a conventional type, having a coupling and brake winding in parallel hard wire connection to each other. As in the case of U.S. Pat. No. 3,757,192, this patent also has the shortcomings mentioned in connection with U.S. Pat. No. 3,667,383.

U.S. Pat. No. 3,757,191 is directed to a polyphase motor control circuit of a stepping motor. However, though utilizing pulses to obtain the several phases to enable a rotating field to be thereby obtained, the motor therein does not have two torques exerted at the rotor in equal and opposite directions for enabling rapid and accurate braking action. Rather, this patent utilizes different and complex pulse train sequences to accomplish stopping of the rotor. This patent involves complex electronics and built-in unreliability due to the number and types of circuts used. In addition this patent also suffers from the shortcomings mentioned in connection with U.S. Pat. No. 3,667,383, above.

U.S. Pat. No. 3,798,526 is for a high speed stepping motor. This patent requires the use of a commutator as part of a wound rotor assembly. Electronic circuts are used to reverse direction of the field of the motor by reversing polarization of the rotor or the stator. Consequently, this patent does not have the advantage of two simultaneous equal and opposing torques to provide instantaneous rotor braking as might be created by two oppositely rotating fields, and hence also suffers from the same shortcomings mentioned in connection with U.S. Pat. No. 3,667,383, above.

SUMMARY OF THE INVENTION

It is therefore an objective of this invention to utilize a stepping motor having a high step resolution for providing incremental steps so as to enable stopping of the rotor at an exact predetermined shaft position by magnetic field action.

Another object of this invention is to enable utilization of a stepping motor that is driven by polyphase energy obtained from a single pulse generator.

Yet another objective is to utilize a stepping motor that has a hard core solid steel rotor or a squirrel cage rotor for ensuring freedom from maintenance, and for obtaining high reliability of operation.

It is yet another objective to avoid multiple rotating wheels in connection with the stepping motor in order to obtain differential outputs that drive the stepping motor.

It is still another object to brake the rotor to a standstill from full rotational speed in very short time durations without the need of a mechanical or friction brake.

It is a further objective to obtain polyphase operation of the stepping motor by utilizing rotating magnetic pulsed fields to provide rotational torque for driving the rotor, and for obtaining simultaneously counter rotational torque for instantly stopping the rotor.

It is still a further objective to provide such torques without reversing stator windings of without switching direction of current flow therethrough.

In accordance with the objectives of this invention, a stepping motor having a rotor of the squirrel cage or hard-steel core types is provided for induction of polyphase flux therein.

Polyphase pulse flux is obtained through a single pulse generator by winding coils on stator pole pieces positioned 120° apart. These coils are sequentially energized in time by switching action of a ring counter to provide the rotating magnetic field required for producing rotational torque upon the rotor.

The same pole pieces have wound thereon in opposite directions coils of identical number of turns as in the first instance for providing thereto on command of the control circuit, current flow in time sequence controlled by another ring counter, producing a counter rotational magnetic field and hence a counter rotational torque upon the rotor to instantly brake the rotor.

The rotor shaft has the character-bearing or font wheel mounted thereon, so that upon momentary stopping of the rotor due to the counter rotational torque, the selected font or character is actuated by a suitable device to make the selected character imprint.

An electromechanical brake may be provided as auxiliary to the counter rotational field braking action, if desired. A digital computer may be alternatively used to perform the required control circuit functions.

DETAILED DESCRIPTION

Figure 2:
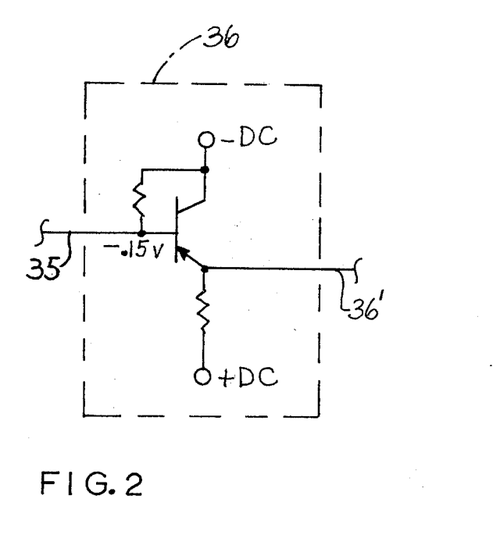
FIG. 2 is a schematic circuit for handling an incremental portion of a differential output to trigger a switch for injecting the counter rotational field.
Figure 3:
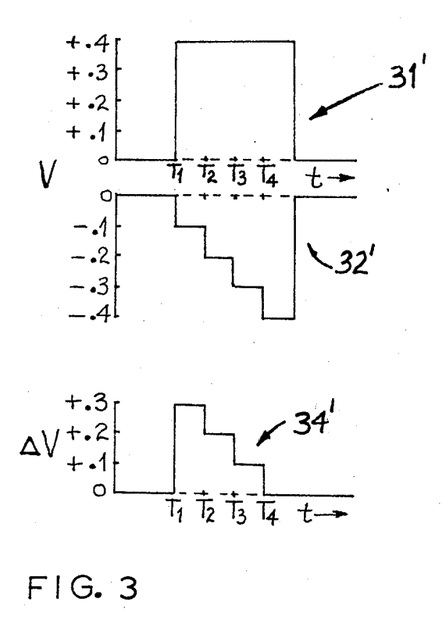
FIG. 3 is a graphical representation of signals produced in the circuit of FIG. 1 during period when a particular character had been selected.
Figure 4:
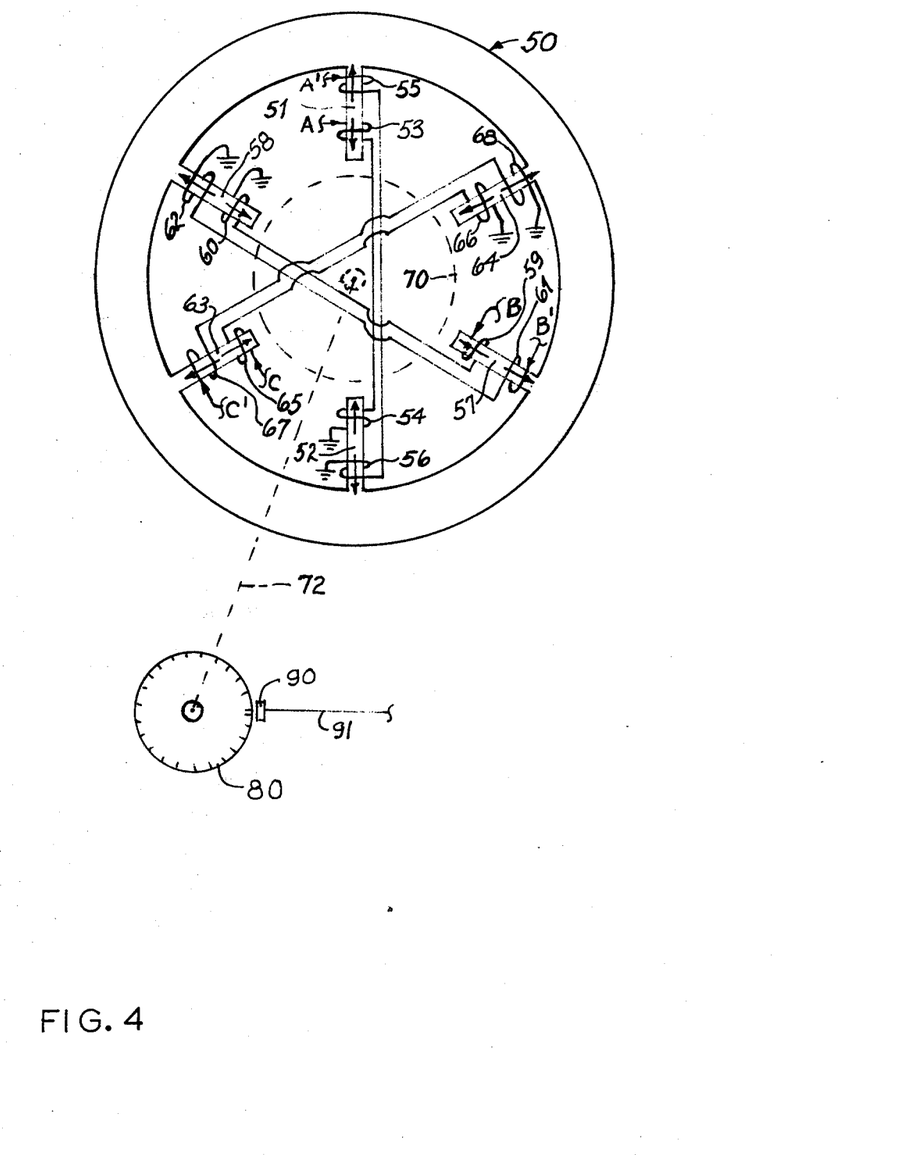
FIG. 4 is an electro-mechanical schematic of the polyphase stepping motor showing coupling of one of the rotor shafts to a character wheel.

Referring to FIGS. 1, 2, 3 and 6, an exemplary control circuit is shown therein to accurately and rapidly stop and restart the motor shown in FIG. 4 at predetermined angular postions of the motor rotor and hence the motor shaft bearing a font or character wheel. The font or character wheel may take on any of the forms shown in U.S. Pat. No. 3,842,960.

Figure 1:
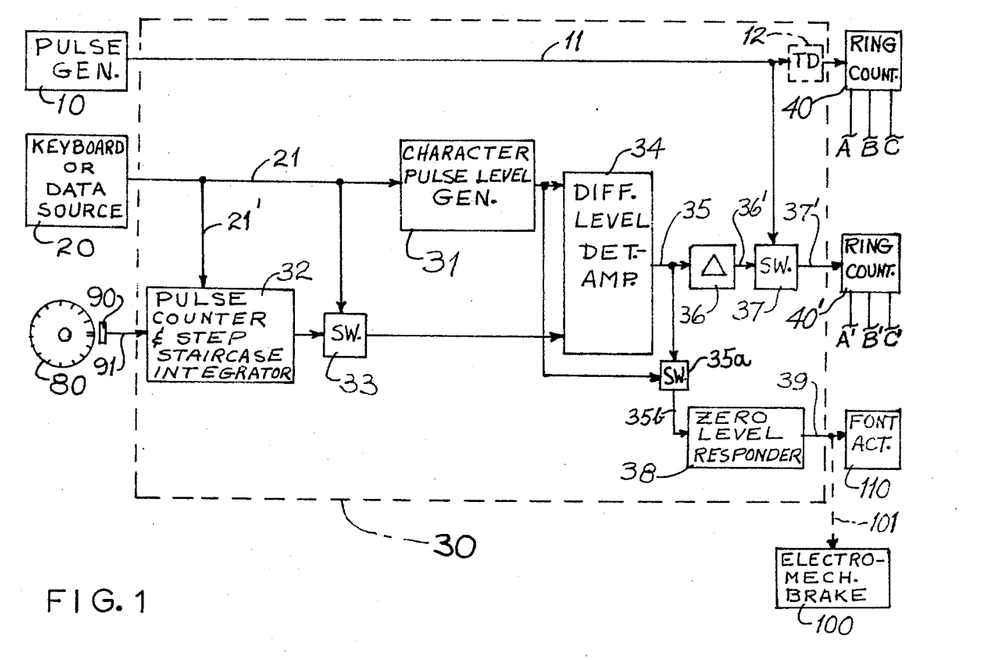
FIG. 1 is a schematic block diagram of the control circuit for the stepping motor showing the principal functions of developing polyphase pulse powered rotational magnetic field in one direction for driving the motor and a counter rotational magnetic field for accurately stopping the rotor at a preselected shaft position.

Pulse generator 10 is used to power the motor. This pulse generator has a capability of providing an output of 30,000 pulses per second, with a pulse width of about three milliseconds and a dead time between pulses of about 7 milliseconds. With the motor having an average speed of about 1800 revolutions per minute, which is equal to 30 revolutions per second, the number of pulses applied to power the motor for one complete shaft or character wheel rotation will be 1000 pulses. We may hypothesize a maximum of ninety-nine characters per character wheel plus one start-count double pulse to effectively have no more than one-hundred pulse trains representing the several characters including the starting-count pulse train. Such characters will accommodate upper and lower case letters, arabic numerals and other miscellaneous symbols. During any one revolution of the character wheel, each charachter will require ten pulses or ten steps to move the rotor from one character position to the subsequently positioned character in the sequential character arrangement about the periphery of the character wheel.

On this basis it is evident that high resolution in position control of the rotor shaft and hence the character wheel may be obtained since stopping can be controlled, aided by the novel concepts hereinbelow, within the pulse train or series of steps comprising a single character. Thus, even if it is desired to stop the character wheel so as to utilize the first character following the point on the wheel where pulse counting is initiated, the character wheel does not have to be delayed in being stopped by virtue of having to complete an additional wheel rotation. As an alternative measure, the first character pulse train, following the start pulse train, may be spacially separated by a greater space than spaces between other characters and suitably placing of the magnetic markers at the periphery of the character wheel 80.

The output of pulse generator 10 is connected by means of wire 11 to time delay (TD) 12 and to switch (SW) 37. Time delay 12 is optional and may be short circuted if not necessary. The only purpose of delay 12 is to permit coincidence of pulse outputs from pulse generator 10 to be applied to ring counters 40 and 40'. Hence if electronic switch 37 has an imperceptible delay of pulses fed thereto by pulse generator 10, then time delay 12 would not be needed.

Since three phases will be provided by ring counters 40 and 40', the same phase will be powered by every third pulse supplied by pulse generator 10.

Typewriter or teletype keyboard or a data source such as stored information on tape as conventionally used with digital computers, is provided at 20. Means 20 provides a series of pulse levels at 21 of the same pulse widths but of differing amplitudes to uniquely represent each character. Hard wire 21 is therefore a cable with as many output leads as there are characters, each output lead connected to a particular circuit of character pulse level generator 31 so as to select the different pulse amplitudes dependent on the character selected by the keyboard. Each key of the keyboard will when providing selected inputs to cable 21, with each such input, trigger switch 33 (through a non-exclusive OR gate, not shown) so as to permit passage of a series of pulses provided by pulse counter and step staircase integrator 32 through switch 33 generated due to rotation of character wheel 80 which has magnetic markers at its periphery, past magnetic head pickup 90, providing such pulses through lead 91 to input of pulse counter and step staircase integrator circut 32, which internally integrates these pulses into a staircase pattern to provide outputs from counter-integrator 32 as shown at 32'.

With each signal output from means 20, a synchronizing pulse as at 21' is provided to trigger a syncronizing circuit in counter-integrator 32 so as to synchronize the pulse train as at 32' with the pulse as at 31'. Suitable time delay may be provided within means 20 so that eventually the output from character pulse level generator 31 will be in time coincidence with the output of switch 33 so that the differential level detector-amplifier 34 will be presented with waveforms as at 31' and 32'. Otherwise, a delay circut may be provided within character pulse level generator 31, in which case a synchronization pulse from generator 31 output may be used to trigger the synchronizing circuit within counter-integrator 32 with similar results.

Since the pulse train identifying a particular character is initiated only on command due to actuation of a key on the keyboard or data coming from source at at 20, the initiated command will provide a pulse at 21' to enable counter-integrator 32 so that it starts counting the markers on wheel 80 beginning with the double pulse marker thereon until the preselected character is reached, and such pulse at 21' will also be the synchronizing pulse as above discussed.

If neither approach as above is used for time synchronization of waveforms 31' and 32', then the synchronization circuit may be incorporated as part of differential level detector-amplifier 34 at the input end thereof.

Either of the three methods is sutable because time coincidence of waveforms 31' and 32' first becomes important in the difference level measuring portion of circuit 34, so as to provide resultant signal as at 34' which is subsequently utilized for control purposes.

Though pulse height had been varied to maintain constant step heights as shown at 32', it is also possible to maintain constant pulse height by varying the height of the steps and changing the width or step duration, thus resulting in a system with varying pulse widths 31' and 32'. In the latter instance it will be necessary to have a differential phase comparator instead of the differential level detector-amplifier 34.

Electronic switch 33 is assumed to have negligible time delay therein, and hence compensation for such switch need not be considered. In any event, generator 31 can have built in sufficient delay so that the output waveforms of generator 31 and switch 33, as the dual inputs to differential level detector-amplifier 34, would be in time coincidence.

Since it is of interest to obtain differential level output between the dual signals provided as inputs to differential circuit 34, it follows that these dual pulse inputs will be of opposite sense or polarity.

Considering a range of ten volts used by circuts 31 and 32 as outputs, representative of one-tenth volt increments of the various characters in question, it may be seen that the results obtained using as an example the fourth selected character following the start count point of the character wheel, represents 0.4 volts. Accordingly, the output of character pulse level generator 31 will be at +0.4 volts as at 31', whereas the output of the counter-integrator 32 is designed to have a negative staircase build up to −0.4 volts as at 32' in the integration portion of circuit 32 for the same pulse duration as pulse 31', during the time periods $T_1 \ldots T_4$ that it takes to build up the counted pulses by circuit 32. Hence, differential level detector-amplifier 34 will have at its inputs, pulses 31' and 32', and an arithmetic difference output 34' of pulses 31' and 32' for the same time periods $T_1 \ldots T_4$, which difference level 34' will be present at 35 at input to circut ($\Delta$) 36 and to switch 35a. Switch 35a will provide the difference output at 35b as an input to zero level responder circuit 38 when, and only when, character pulse lever generator 31 as providing an output signal, so as to trigger and close switch 35a during such period of operation of generator 31, and at other times not energize and maintain switch 35a in open circut position.

In view of the rapid stopping (braking) action of the stepping motor, only the time period between $T_3$ and $T_4$ need by of interest. Accordingly, transistor circuit 36 will have +0.1 volts applied to the base of such transistor. The base is biased negatively at −0.15 volt potential with respect to the positive potential applied to the emitter, and hence circuit 36 will have base, emitter and collector current flowing to provide an output at 36'. However, circuit 36 will block all higher differential outputs 34'. For example, when $\Delta V$ is +0.2 volts between $T_2$ and $T_3$ applied at 35, the base will be at a +0.5 volt potential, preventing current flow in the base, emitter and collector circuits, and therefore no output at 36' will be provided. It follows that all $\Delta V$ steps, created by algebraic sum (or difference in magnitude) between signals 31' and 32' may be scaled by factors of 5 or 10, in which case the bias at 35 of the base of the transistor in circuit 36 will also be equally scaled in proportion.

The output at 36' is important under the stated conditions, because these will be the conditions occurring during selection of any particular character, and is the so called active period of this control circuit, to provide a trigger to electronic switch (SW) 37 so that power from pulse generator 10 may pass through switch 37 and provide a series of pulse step inputs at 37' to ring counter 40' in substantial coincidence with pulse inputs to ring counter 40.

The output of differential level detector-amplifier 34 is provided as an input to electronic switch 35a. The output of switch 35a is provided as an input to zero level responder 38 at 35b. The output of character pulse level generator provides the signal needed for switching action of switch 35a, so tht switch 35a will be closed during the entire period when generator 31 is providing signal level outputs, and will be open at all other times. When closed, switch 35a will permit signals from output of differential circuit 34 to be provided as inputs to zero level responder 38.

Figure 6:
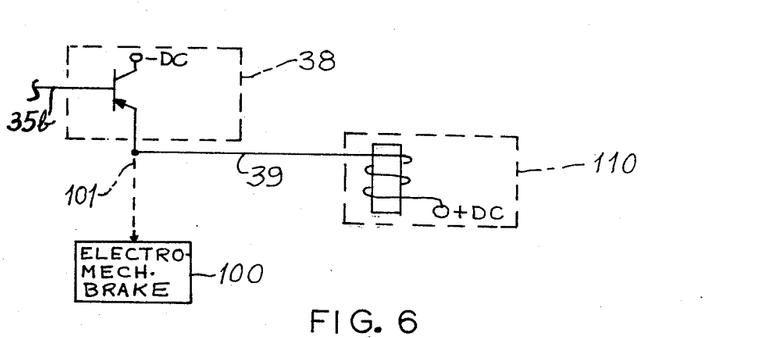
FIG. 6 is a schematic of a zero level responder and font acutator as used in this invention.

Zero level responder 38 does not recognize any $\Delta V$ output at 35b, as shown at 34', except when such output is zero, as at $T_4$ of waveform 34' for example. Circuit 38 may consist of a transistor whose base requires a zero bias potential with respect to the emitter in order for base current to be provided, and hence emitter and collector current to be established. Accordingly, during the selection mode of any character, a positive $\Delta V$ at 35 and hence at 35b will prevent current conduction of the transistor of circuit 38, and will prevent energizing font actuator 110 by current flowing through wire 39, actuator 110 being used to move any of the selected fonts of the character wheel so as to make a character imprint.

On the other hand, a zero level voltage at 35 and hence at 35a will cause font actuator 110 to be energized. No problems exists either when the entire typewriter is not operated or powered, since switch 35a is open preventing energizing of actuator 110, nor can negative pulses be present at 35 and 35b in that pulse format 34' results due to simultaneous presence of pulses 31' and 32', and thereby results in $\Delta V$ level at 34' which will either be positive or zero.

Hence with zero level at 35 and 35b, if desired, although it will be shown that same is not needed, a fast electromechanical brake 100 may be used as backup, powered by signal level appearing at 101.

Activation of font actuator 110 will occur after ring counter 40' has provided pulse energy from pulse generator 10 to the motor of FIG. 4 to be hereinbelow described.

In the foregoing, character pulse level generator 31, pulse counter and step staircase integrator 32, switches 33, 35a and 37, differential level detector-amplifier 34, circuit 36, and zero level responder 38 comprise logic and computation electronics 30 which may also be performed by a digital computer. Time delay 12 may or may not be essential to logic circuit 30, depending on the speed of operation of switch 37.

The components in circuit 30 are, as independent circuits, known in the art, and hence no details beyond block diagram level need be shown, except where unusual functions are performed, which unusual functions have been separately illustrated and discussed herein, for obtaining a better understanding of the several functional interreltionships in this system.

Figure 5:
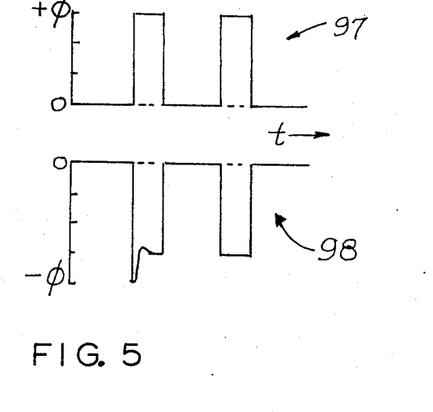
FIG. 5 is a graphical representation of the flux in each phase of the rotational magnetic and counter rotational magnetic fields.

Referring to FIGS. 1, 4 and 5, a three phase (polyphase) pulse energized motor is provided at 50, shown schematically for clarity. The stator structure has pole pieces 51 and 52, 180° disposed with respect to each other, as integral portions of the stator. Coil 53 is wound in a first direction on pole piece 52. Coils 53 and 54 are serially interconnected and powered by phase A output of ring counter 40. Coil 55 is wound in a direction opposite to that of coil 53 or in a second direction on pole piece 51 whereas coil 56 is wound in the second direction on pole piece 52. Coils 55 and 56 are serially interconnected and powered by phase A' output provided by ring counter 40'. As a result, portions of the pulse train provided by pulse generator 10 will be switched by ring counters 40 and 40' when same are respectively powered by pulse generator 10 output, to provide phase outputs A, B, C and A', B', C' respectively.

Initially, when power is applied to the system, that is pulse generator 10 is providing output, ring counter 40 will provide three phase outputs A,B,C due to pulses at 11, creating flux $+\phi$ as at 97 as a function of time. Flux $+\phi$ represents one of the phases of output power (phase A) provided by ring counter 40 and indicated in FIG. 4 by arrows on pole pieces pointing inwardly toward rotor 70. When a character is selected, ring counter 40' will provide complementary phase power to coils 55 and 56 (phase A'), create a current therethough and provide a flux $'\phi$ illustrated as at 98 in coincidence with flux $+\phi$ at 97 in opposite direction to that of flux $+\phi$ due to opposite direction of winding of coils 55 and 56 with respect to direction of winding of coils 53 and 54. All coils herein are of the same number of turns and hence present the same inductive and resistive qualities. Of course all coils could have been wound in the same direction, in which case a phase inversion circuit would have to be supplied in series with either counter 40 or 40' to provide oppositely polarized pulses from pulse generator 10 to counters 40 and 40'.

Similarly, stator structure as at 50 has pole pieces 57 and 58 spatially displaced about the inner stator periphery 120° with respect to pole pieces 51 and 52 respectively. Pole piece 57 has coil 59 wound in a first direction and pole piece 58 has coil 60 wound thereon in the same first direction. Coils 59 and 60 are serially interconnected with each other and connected to phase B output of ring counter 40. Coil 61 is wound on pole piece 57 and coil 62 on pole piece 58 in a second direction opposite to the first direction. Coils 61 and 62 are serially interconnected to each other and connected to phase B' output of ring counter 40'.

In like manner, stator structure at 50 has pole pieces 63 and 64 spatially displaced about the inner periphery of the stator by 240° with respect to pole pieces 51 and 52 respectively, all pole piece locations taken for convenience in a clockwise direction when viewing structure 50 of FIG. 4. Coils 64 and 66 are wound on pole pieces 63 and 64 respectively in a first direction and these coils are serially interconnected and powered by phase C of ring counter 40. Coils 67 and 68 are wound on pole pieces 63 and 64 respectively in a second direction opposite to the first direction and these coils are serially interconnected and powered by phase C' output of ring counter 40'.

As in the case of coil pairs 53–54 and 55–56, equal and opposite fluxes as shown in FIG. 5 will be provided during electrical braking mode, to all other coil pairs discussed.

Ring counters as provided at 40 and 40' are well known in the art, and with minor changes in solid state devices to accommodate power requirements of the instant motor, such counters are shown in textbook entitled: Sourcebook of Electronic Circuts by John Markus, McGraw-Hill Book Company, New York, Copyright 1968 at pages 152–164, 314, 405 and 820. The same counters are cross-referenced for greater details in this textbook to various Electronics magazine issues.

The several output stages of the referenced ring counters may be used to provide the several phases ABC or A'B'C' respectively for counters 40 and 40', and if more phases are desired for driving the motor additional counter stages may be added to the ring counters.

The basic use of ring counter 40 herein is to provide a three phase output ABC in time sequence controlled by switching action of ring counter 40 from stage to stage and then back to the first stage of the counter, and thereby provide three phase pulsed power in time separation due to ring counter switching action and in space separation of 120° between successive phases due to energizing of coils at such spaced pole piece locations to produce a rotating field and thereby provide a clockwise rotational torque upon rotor 70 to normally run the motor by steps consisting of pulses from generator 10.

The requirements for a rotating field as set forth in design criteria in the textbook entitled: AC Machines, Vol. II, by Liwshitz-Garik and Whipple, D. Van Nostrand Company, New York, 1946, at pages 106–117, 231–234 and 288, is satisfied by the foregoing arrangement of the motor components. Therein, the prominent authors stated that a polyphase motor or an AC commutator motor, unlike a single phase motor, has a rotating field and consequntly does not requre separate starting windings, shaded poles or the like. Starting windings or shaded poles are detrimental to quick stop and start or restart action, and the only practical way to electrically stop such non-polyphase motors is by temporarily reversing the field, which consumes time and defeats the purpose to which this type of motor is used.

In fact, in the instant invention, the rotor is electrically braked by virtue of equal and oppositely rotating fields in phase coincidence of each of the several phases provided to the motor through ring counters 40 and 40'.

It is noted that action of electronic switch 37 in turning on ring counter 40' at the signal triggering the switch closed due to a character input signal, will slightly overshoot the normal negative flux excursion for a short period of time within a single pulse of flux duration. Inasmuch as the purpose of flux at 98 is to overcome the effect of an oppositely rotating field due to flux pattern per phase as at 97, the additional switching transient overshoot will be of assistance in more quckly electrically braking rotor 70 to a halt.

With this system, since one step per phase can consist of 10 pulses constituting a change from one character position on wheel 80 to the next in sequence character position, it is obvious that high resolution step control is obtained with ability to electrically brake by virtue of oppositely rotating fields within several pulse durations. Thus from start of count position (double pulse on wheel 80) it is possible to stop rotor 70 so that it is stopped at the first character following the start count position from the full speed of motor rotation.

It must always be remembered that in the instant system pulse power creating the rotating field to impell rotor 70 in the desired direction is never disconnected or reversed, but the system provides an equal and opposite rotating field to create an equal and opposite torque to instantly stop rotor motion. In so doing, immediate restart is provided on completion of character imprint action, since the equal and opposite rotational field and hence the equal and opposite torque occurs only during font or character selection.

It is to be noted, that for convenience of illustration, rotor 70 was shown in dotted lines and motor shaft 72 was shown in dotted line coupling rotor 70 to character or font bearing wheel 80 in FIG. 4.

As is well known, the instant motor may utilize a squirrel cage rotor, or for greater efficiency a deep bar squirrel cage rotor or a double-cage rotor as shown in the Electric Machinery textbook at page 232, as referred to above.

Such rotors have the obvious advantage of high torque as well as good reliability, absent commutators or slip rings. A wound rotor may be used as well as a commutator-type rotor, however, the polyphase powering of the motor makes all but squirrel cage or double-cage rotors less desirable. It is also possible to use a rotor made of several segments of hard steel which due to the rotating field provided by the stator will impart rotational torque thereupon based on hysterysis effects.

Figure 7:
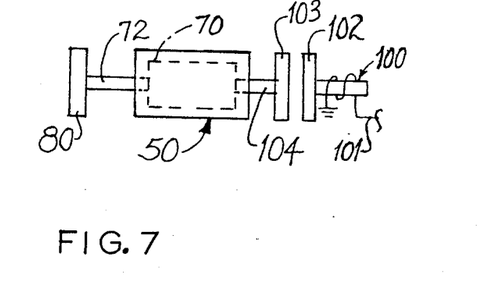
FIG. 7 is a mechanical schematic of the stepping motor with one shaft of the rotor coupled to a disk member and showing a braking device electromagnetically energized to abrasively create frictional braking action upon the rotor by cooperation of the brake device with the disk member.

Referring to FIG. 7, the additional electromechanical brake 100 is shown in relation to rotor 70 of the stepping motor. Rotor 70 has a shaft 104 at opposite end from shaft 72 driving a metal disk 103. Electromechanical brake 100 is actuated when current flows through its coil at 101, as above discussed. Brake 100 has on its armature an abrasive disk 102, so that when current flows through brake coil 101, the face of disk 102 co-operates with the face of rotating metal plate 103. The armature of brake 100 is designed to only move laterally against or away from disk 103 and not rotate with disk 103. Consequently, upon contact of faces of disks 103 and 102, the friction therebetween stops rotor 70 which already has by this time lost its impelling torque due to negativing the rotating field as above described.

Figure 8:
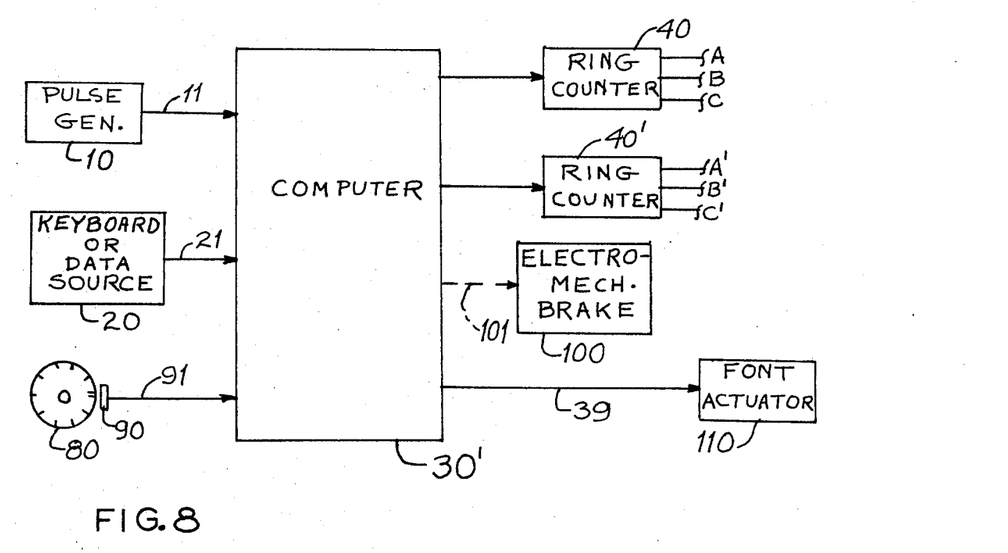
FIG. 8 is a block diagram schematic similar in purpose to that of FIG. 1 except that a digital computer is used in lieu of the logic circuit and computational elements of FIG. 1.

Referring to FIG. 8 the same pulse generator 10 provides pulse output at 11. Keyboard or data source 20 provides output at 21. Motor as in FIG. 4 having font or character wheel 80 and magnetic pickup 90, provides pulse train pickup at 91 due to magnetized markers at the periphery of wheel 80 and rotation of such wheel. Therefore, inputs at 11, 21 and 91 are provided to computer 30'. Digital computer 30' provides similar functions as described above in connection with logic system 30, and hence the computer will provide activation of ring counters 40 and 40', each having a three-phase output for providing rotating field energy and hence rotational torque to the motor and for counteracting the rotational torque by a counter-rotational torque for rapid braking of the motor. As in the foregoing system, electromechanical brake at 100 provides auxiliary motor shaft braking action by signal at 101, if desired. Upon stopping of the rotor and hence the font wheel 80, a signal at 39 provides energy to font actuator 110 for translating the selected font and making an imprint thereby.

Except for the same connections as made in FIG. 1 between pulse generator 10, ring counters 40 and 40' and switch 37, the remaining functions described in connection with circuit 30 are performed by computer 30'.

Computers have been used for executing the various functions of control generally allocated to circuit 30, above. Maintenance Manual for the 1970 Terminet Model 300 describing General Electric Company Keyboard Printer, has a comparator therein for identifying and distinguishing between the various character identifying pulses and the starting point double pulse on the character wheel for starting the count sequence for each character as sensed by the magnetic pick up head. This circuit also recognizes the spacing difference between the several character pulses and between the start-count double pulse and any selected character.

What is claimed:

1. A stepping motor, comprising in combination:
   a rotor;
   a stator structure, magnetically coupled to the rotor, having a first plurality of windings and a second plurality of windings, each one of the first plurality of windings being in space coincidence with only one of the second plurality of windings; and
   a plurality of pole pieces integral with the stator structure and disposed at regular intervals therewithin, each one of the pole pieces having one each of the first and second plurality of windings thereon, the windings of said first plurality of windings on such of the pole pieces which are oppositely disposed being serially interconnected, the windings of said second plurality of windings on such of the pole pieces which are oppositely disposed being serially interconnected, said first plurality of windings when energized by phased pulse power producing magnetic flux in a first direction and a rotational torque upon the rotor, and said second plurality of windings when energized by phased pulse power producing magnetic flux in opposition to the first direction and a counter rotational torque upon said rotor substantially equal in magnitude to the rotational torque.

2. A stepping motor, comprising in combination:
   a rotor;
   a stator structure, magnetically coupled to the rotor, having a first plurality of windings and a second plurality of windings;
   a first ring counter having a first plurality of stages equal in number to the first plurality of windings, each one of the first plurality of stages being electrically connected to only one of the first plurality of windings; and
   a second ring counter having a second plurality of stages equal in number to the number of the first plurality of stages, each one of the second plurality of stages being electrically connected to only one of the second plurality of stages being electrically connected to only one of the second plurality of windings.

3. The invention as stated in claim 2, including a pulse power source providing pulse power to said ring counters.

4. The invention as stated in claim 3, including a time delay circuit electrically interposed between the pulse power source and the first ring counter.

5. The invention as stated in claim 2, including a pulse power source providing pulse power to the first ring counter and at selected time periods to the second ring counter.

6. The invention as stated in claim 2, including switch means, in circuit with the second ring counter, for providing said pulse power therethrough in anticipation of a predetermined position of the rotor.

7. The invention as stated in claim 6, including:
   character pulse level generating means responsive to a plurality of character signals applied to its input;
   a pulse counter-integrator; and a differential level detector, electrically fed by the character pulse lever generating means the the pulse counter-integrator.

8. The invention as stated in claim 7, wherein the output of the differential level detector provides a triggering input to the switch means.

9. The invention as stated in claim 7, including:
a switch responsive to the differential level detector; and
a zero level responder, in circut with the switch and activated by signal outputs from the differential level detector during existance of signals supplied by the character pulse level generating means.

10. The invention as stated in claim 9, including an electromechanical brake, electrically connected to the output of the zero level responder, activated by virtue of a zero bias condition of the zero level responder within a time period of signal output provided by the character pulse level generating means to the switch.

11. The invention as stated in claim 7, including data generating means, electrically connected to the pulse counter-integrator, to the character pulse level generating means, and through the switch means to the differential level detector.

12. The invention as stated in claim 7, including:
a wheel having markers spaced peripherally thereon, said wheel being coupled to the rotor; and
a pickup device, intermittently magnetically coupled to the markers, and electrically connected to the pulse counter-integrator.

13. The invention as stated in claim 7, including an electronic switch counter-integrator and the differential level detector.

14. The invention as stated in claim 7, including an electronic circuit electrically interposed between the differential level detector and the switch means.

* * * * *

UNITED STATES PATENT OFFICE
CERTIFICATE OF CORRECTION

Patent No. 4,019,110        Dated April 19, 1977

Inventor(s) Martin E. Gerry

It is certified that error appears in the above-identified patent and that said Letters Patent are hereby corrected as shown below:

Claim 7, Column 11, line 2 should read:

-- character pulse level generating means and the --.

Claim 13, Column 12, lines 14-16 should read:

13. The invention as stated in claim 7, including an electronic switch electrically interposed between the pulse counter-integrator and the differential level detector.

Column 1, line 54, "circuts" should read -- circuits --.
Column 1, line 59 "circuts" should read -- circuits --.
Column 5, line 44, "circuts" should read -- circuits --.
Column 5, line 47, "by" should read -- be --.
Column 7, line 22, " $\phi$ " should read -- $-\phi$ --.
Column 7, line 51 "Coils 64 and 66 should read -- Coils 65 and 66 --.

UNITED STATES PATENT OFFICE
CERTIFICATE OF CORRECTION

Patent No. 4,019,110            Dated April 19, 1977

Inventor(s) Martin E. Gerry

It is certified that error appears in the above-identified patent and that said Letters Patent are hereby corrected as shown below:

Column 7, line 67, "Circuts" should read -- Circuits --.

Column 8, line 31 "consequntly" should read -- consequently --.

Column 6, lines 67-68 should read:

-- wound in a first direction on pole piece 51 whereas coil 54
     is wound in the first direction on pole piece 52. Coils 53 --, Signed and Sealed this Twenty-eighth Day of June 1977

[SEAL]

Attest:

RUTH C. MASON
*Attesting Officer*

C. MARSHALL DANN
*Commissioner of Patents and Trademarks*